April 15, 1958 S. D. WARNER 2,830,866
RECORDING APPARATUS
Filed Sept. 22, 1955
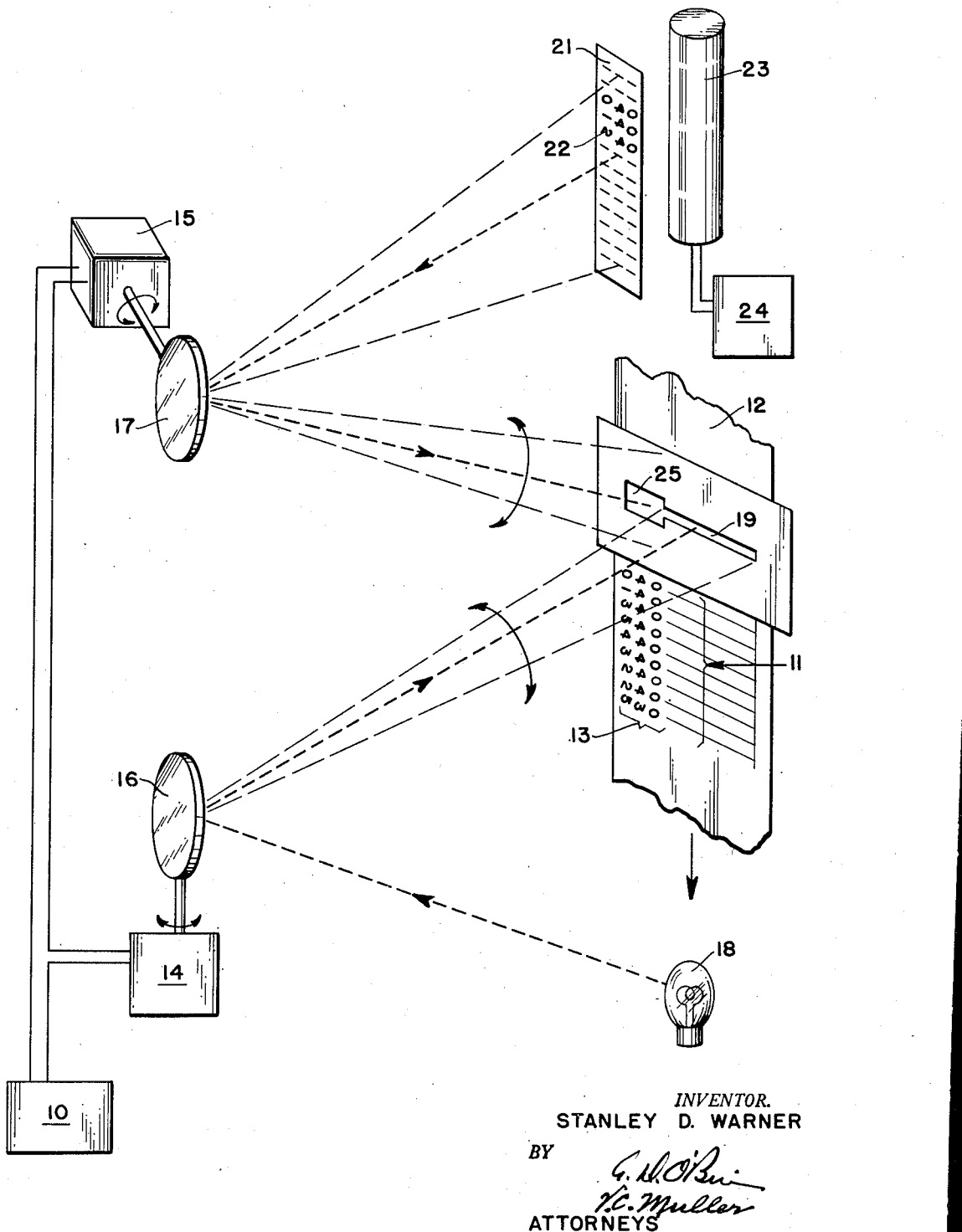
INVENTOR.
STANLEY D. WARNER
BY
ATTORNEYS

2,830,866

RECORDING APPARATUS

Stanley D. Warner, Ontario, Calif., assignor to the United States of America as represented by the Secretary of the Navy Application September 22, 1955, Serial No. 536,057

3 Claims. (Cl. 346—66)

(Granted under Title 35, U. S. Code (1952), sec. 266)

The invention described herein may be manufactured and used by or for the Government of the United States of America for governmental purposes without the payment of any royalties thereon or therefor.

This invention relates to recording apparatus and more specifically to apparatus for plotting a graph representing variations in a measured function and simultaneously forming indicia periodically describing the value of the function.

In the measuring and testing art, it is common to form graphs indicative of variations in a condition or function by forming a continuous line of varying deflection from a reference line on a record strip. One method of accomplishing this result is to cause movement of a record strip at a controlled rate past a mark forming means which has motion transverse to the line of movement of the strip, the position of said means being controlled in response to variations in the condition to be measured. In this method of providing a graphic record of varying conditions, it is preferable that the record strip be provided with markings for use as reference means in assessing the value of the deflection of the curve.

This invention is concerned with the provision of means to periodically mark the record strip with the instantaneous value of the deflection so that the record strip need not be calibrated with the marking means or with its support and so that no particular measuring technique is necessary in reading or assessing the curve. This novel arrangement is adaptable to any continuous recording apparatus of the class described but finds one of its best applications in conjunction with photographic techniques for forming graphic records of the nature discussed. Such techniques have the advantages of being generally of greater sensitivity than purely mechanical scribing systems by virtue of the frictional and other operational limitations of such mechanical systems. However, in the use of photographic techniques, assessment of the resulting graph or curve is complicated by the fact that the sensitive paper on which the graph is formed generally has no reference lines thereon. If a prepared sensitive paper did have such lines, it would present a serious calibration problem since each strip would necessarily have to be exactly marked and positioned relative to the graph forming means and the necessity for not exposing the film would make it difficult to check or set the position of the strip.

This invention provides means whereby numerals indicating the degree of deflection of the graph at timed intervals may be periodically photographically imprinted on the record strip during the period while the graph is being formed so that there is no need for involved calibration or other measurement to accomplish reliable assessment of the values represented by the graph. Thus, if a means for forming such numbers is calibrated or correlated with a means for deflecting the beam of light which forms the graph on the sensitive paper, any simultaneous photograph of the two means will give a numerical value coinciding with the value of the graph deflection also being recorded at that instant. The result therefore, with periodic photographing of the numerical indicia and continuous graph recording, is a photograph showing a curve and a series of numbers related to the curve to give the instantaneous deflection values of the curve. Measurement or other calibration or marking of the record strip is thus made unnecessary.

It is, accordingly, an object of this invention to provide means for recording, on a single record strip, a continuous curve indicating variation in a condition or function, and for periodically recording indicia describing the instantaneous degree of deflection of the curve representing the varying condition or function.

It is a still further object of this invention to provide means to photographically record, on a sensitized record strip, a curve indicative of variations in a condition or function, and to periodically photograph on the same record strip, indicia describing the instantaneous degree of deflection of the curve.

Another object of this invention is to provide a plurality of means for indicating deflection and the numerical value thereof on a single record strip whereby calibration of the plurality of means to one another makes it unnecessary to calibrate each record strip used in the apparatus.

Still another object of this invention is to provide an apparatus for periodically photographically recording numerical indicia describing the measured value of a changeable condition to be measured.

Other objects and numerous advantages of the present invention will become apparent as the same becomes better understood from the following detailed description taken in conjunction with the annexed drawing in which the single figure represents a schematic showing of a recorder according to the invention.

Referring now to the drawing, the reference numeral 10 denotes a device for generating a function, in the form of an electrical signal in response to variation of a condition. Such devices are old and well known and the details thereof do not form a part of this invention and are accordingly not shown or described. Device 10 generates a varying electrical signal, which is to be photographically recorded in the form of a graph 11 on a strip of film 12 and whereon there is also to be periodically recorded digits 13 describing the instantaneous value of the graph. To this end, a pair of galvanometer devices 14 and 15, connected in series as shown, are coupled to the output of the signal generating device 10. Galvanometer devices 14 and 15 have mirrors 16 and 17, respectively, mounted on the rotary elements thereof. Thus, annular deviations between the planes of mirrors 16 and 17 from fixed reference planes will be proportional to one another and will be dependent upon the value of current allowed to flow through galvanometers 14 and 15 by the signal generating device. Therefore, the varying deviations are dependent upon the varying values of the function to be recorded, as represented by varying output of electrical current by the device 10. Since the galavanometers are connected in the circuit in series, the deviations of the two mirrors are always in a fixed proportion to one another for given galvanometer devices used within their normal range of operation.

Strip film 12 is suitably supported on means (not shown) for causing movement thereof at a controlled rate past a position at which the two mirrors 16 and 17 may reflect light thereon. A mask 20, having a slit 19 is positioned over the film with the slit transverse to the direction of movement of the film. A beam of light from a source 18 is reflected by mirror 16 onto film 12 through the slit 19 and this reflected beam is adapted to be deflected lengthwise of slit 19 by pivotal movement of the mirror, by virtue of appropriate placement of the galvanometer 14 (which supports mirror 16) as shown in the drawing. Thus, variations in the signal generated by device 10 cause fluctuating deviations in the position of mirror 16 so that the spot of light reflected from source 18 by the mirror traverses the slit 19 in varying places so that such fluctuations combined with the movement of film strip 12, result in formation of a graph 11 on the film strip.

In order to form indicia 13 on film 12 there is provided an opaque scale 21, having formed thereon a series of transparent numerals 22 having a range equal to or greater than the range of the function to be recorded, the scale being supported in a fixed but adjustable position by suitable means (not shown). A flash lamp 23 is positioned behind scale 21 so that a beam of light therefrom, passing through the transparent numerals on the scale is directed to mirror 17. Mirror 17, as illustrated, is arranged to scan lengthwise of scale 21 and the beam of light is reflected from the mirror through the enlarged portion 25 of slit 19, the specific numeral so projected depending upon the relative instantaneous position of the mirror 17. Flash lamp 23 is periodically triggered by a timing device so that the numerals are projected only at chosen intervals of time. Suitable optical systems, not shown, are provided for proper focusing of the various images, the beam from source 18 being preferably focused to a point of light. The optical system for the light beam from flash lamp 23 may be so chosen as to permit stray light to form the horizontal reference lines shown on the strip 12 as the numeral indicia are formed if it is desired that such lines appear on the completed record.

In operation, lamp 18 is continuously energized whereby pivotal movement of mirror 16 in accordance with the output signal from device 10 will cause the continuous graph 11 to be recorded on film 12. Flash lamp 23 is periodically actuated during the recording of graph 11 by operation of the triggering or timing device 24 whereby to cause indicia 13 to be periodically recorded on film 12, pivotal movement of mirror 17 causing the value of the recorded indicia to vary in accordance with the signal applied to galvanometer 15 to reflect appropriate indicia 22 to the strip 12 from the scale 21. Since galvanometers 14 and 15 are connected in electrical series, the current signal applied thereto, at any instant is the same, and, therefore, the device can be so adjusted and calibrated that the recorded numbers or indicia will accurately describe the instantaneous values of the recorded function. Once such calibration is effected, it is not necessary to again calibrate each time a new record strip is associated with the mechanism.

From the above it will be apparent that this invention provides new apparatus for recording a graph indicative of a varying function and for also recording on the same record strip, indicia descriptive of the value of the function at periodic intervals. Such apparatus, simple and inexpensive in construction, simplifies the problem of record assessment since direct readings may be made, and is further advantageous in that calibration of each record strip used in the apparatus is not necessary.

Obviously, many modifications and variations of the present invention are possible in the light of the above teachings. While the single specific illustrative example given herein is entirely photographic in operation, mechanical printing and scribing means could be used. It is therefore to be understood that the invention is not intended to be limited to the specific illustrated modification, its scope being rather defined by the appended claims.

What is claimed is:

1. Recording apparatus comprising a device for generating electrical signals in response to changes in the value of a condition to be measured, a pair of motor means electrically connected in series to said device whereby said motor means are simultaneously and proportionately movable in response to said electrical signals, a mirror mounted on each of said motor means for movement thereby, a film strip supported for movement past a recording station within optical range of both of said mirrors, a constant light source supported in a position in which a beam of light therefrom is reflected by one of said mirrors to said recording station, a flash lamp supported in a position in which a beam of light therefrom is reflected by the other of said mirrors to said film, an opaque mask having a numerical scale represented by transparent indicia thereon being supported between said flash lamp and said second mirror whereby light from said lamp projects said indicia to said mirror for reflection to said film, and a timing device connected to said flash lamp to periodically cause it to emit a beam of light, whereby latent images are formed on said film which are representative of a continuous curve representing the varying condition and of periodically instantaneously formed numerical indicia denoting the measured values of said condition.

2. Apparatus for recording the graph of an electrical signal which varies in accordance with the value of a fluctuating condition and indicia periodically describing the instantaneous value of the condition, comprising a device for generating said electrical signal, a pair of series connected mirror galvanometers in the output circuit of said device, a moving strip of light sensitive film, a mask positioned adjacent said film and having a slit extending transversely of the film and an enlarged aperture at one end of the slit, a first light source adjacent one of said galvanometers, a second intermittently energizable light source adjacent the other of said galvanometers, and a mask having transparent indicia formed therein, disposed between said last mentioned galvanometer and light source, the arrangement being such that pivotal movement of the mirror of said one galvanometer as a result of variations in said electrical signal will cause a reflected beam of light from said first source to traverse lengthwise of said slit in accordance with said signal and form on said film a graph corresponding to said signal, the mirror of said other galvanometer acting to reflect, during the energized periods of said second light source, the image of a selected one of the indicia on said indicia bearing mask onto said film through said aperture, pivotal movement of said last mentioned mirror causing the selected indicia to vary in accordance with the instantaneous value of said signal whereby to form on said film, indicia describing the instantaneous value of said graph at periodic intervals.

3. Recording apparatus comprising a moving strip of light sensitive film, an opaque mask positioned adjacent said film, said mask having a light transmitting slit transverse to the direction of movement of said film, a constant light source, a first mirror positioned to reflect light from said source through the slit in said mask to said film, said mirror being mounted for rotation about an axis generally parallel to the direction of movement of said film strip whereby said light beam may be moved transversely of said slit by movement of said mirror about said axis, a flash lamp, a second mirror positioned to reflect light from said lamp through said slit to said film, said second mirror being mounted for rotation about an axis generally perpendicular to the direction of movement of said film strip, a second opaque mask having transparent indicia in the form of a numerical scale thereon positioned between said second mirror and said flash lamp whereby the light from said flash lamp projects said indicia to said slit, the position assumed by said second mirror about its axis of rotation determining which number of the scale is projected through said slit, a timer electrically connected to said flash lamp to periodically operate the lamp, a device for generating electrical signals in response to changes in the value of a condition to be measured, a pair of galvanometers electrically connected in series to said device, each of said galvanometers being connected to one of said mirrors to move it about its axis whereby the two mirrors are simultaneously and proportionately movable in response to said electrical signals, the first mirror thus forming on said film strip a latent image of a continuous curve representative of changing values in said condition, and the second mirror forming a series of latent images of the numerical values of the said condition as controlled by the operation of said timer.

References Cited in the file of this patent

UNITED STATES PATENTS

| | | |
|---|---|---|
| 2,005,108 | Pudelko | June 18, 1935 |
| 2,147,623 | Wender | Feb. 14, 1939 |
| 2,159,969 | Furst | May 30, 1939 |
| 2,316,550 | Bigalke | Apr. 13, 1943 |
| 2,343,621 | Williams | Mar. 7, 1944 |
| 2,544,919 | Dueringer | Mar. 13, 1951 |
| 2,634,317 | Marchand et al. | Apr. 7, 1953 |